(12) United States Patent  (10) Patent No.: US 7,594,790 B1
Edelen  (45) Date of Patent: Sep. 29, 2009

(54) SYSTEM AND METHOD FOR POOLING SMALL VOLUMES OF LIQUID

(75) Inventor: David A. Edelen, Arlington, TX (US)

(73) Assignee: Alcon, Inc., Hunenberg (CH)

( * ) Notice: Subject to any disclaimer, the term of this patent is extended or adjusted under 35 U.S.C. 154(b) by 525 days.

(21) Appl. No.: 11/429,341

(22) Filed: May 5, 2006

Related U.S. Application Data

(60) Provisional application No. 60/692,896, filed on Jun. 22, 2005.

(51) Int. Cl.
  *B65G 65/34* (2006.01)
  *B65B 3/28* (2006.01)
(52) U.S. Cl. .......................... 414/412; 141/83; 141/98
(58) Field of Classification Search .............. 141/83, 141/98, 177, 329; 222/80, 81, 83, 83.5, 87, 222/88; 137/76; 414/412
  See application file for complete search history.

(56) References Cited

U.S. PATENT DOCUMENTS

| | | | | |
|---|---|---|---|---|
| 3,487,965 | A * | 1/1970 | Gale | 414/412 |
| 3,939,623 | A * | 2/1976 | Shine et al. | 414/412 |
| 4,418,460 | A * | 12/1983 | Ruth | 29/403.3 |
| 4,944,647 | A * | 7/1990 | Oleson et al. | 414/412 |
| 5,358,376 | A * | 10/1994 | van den Top | 414/412 |
| 6,652,215 | B1 * | 11/2003 | Parker et al. | 414/412 |
| 7,306,420 | B2 * | 12/2007 | Roura Adell et al. | 414/412 |
| 2003/0185732 | A1 * | 10/2003 | Roura Adell et al. | 422/297 |
| 2004/0123567 | A1 * | 7/2004 | McErlean et al. | 53/445 |
| 2005/0011823 | A1 * | 1/2005 | Delnevo et al. | 210/252 |

* cited by examiner

*Primary Examiner*—Gregory L Huson
*Assistant Examiner*—Nicolas A Arnett
(74) *Attorney, Agent, or Firm*—W. David Lee

(57) ABSTRACT

A system for removing and pooling together small volumes of liquid contained in individual small bottles includes a collection and feed mechanism for passing individual small bottles to a cutter mechanism. At another mechanism the top portion of the bottle is separated from the bottom portion of the bottle. A dumper mechanism discharges the small volumes of liquid into a collection container.

5 Claims, 2 Drawing Sheets

SYSTEM AND METHOD FOR POOLING SMALL VOLUMES OF LIQUID

Figure 1:
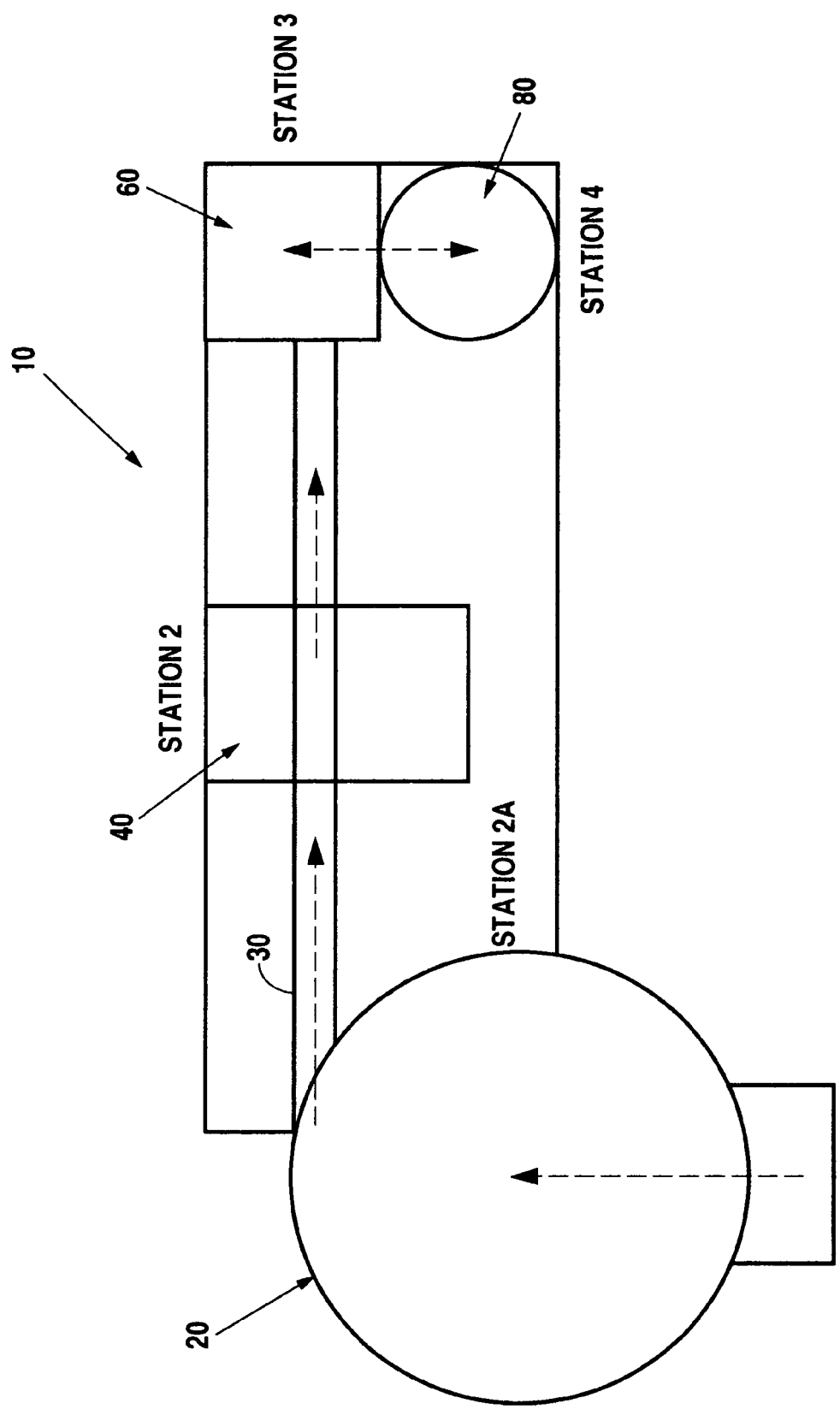

This application claims the benefit of U.S. Provisional Patent Application Ser. No. 60/692,896 filed Jun. 22, 2005

FIELD

The present invention describes a system and method for emptying small volumes of liquid from individual bottles; more particularly, the present invention relates to an automated system and method for removing the tops from individual sealed bottles and pooling the small volumes of liquid contained in each individual bottle together in a collection container.

BACKGROUND

In the pharmaceutical industry, for example, it is common practice to conduct both scientific and market studies of how medicines or treatments work on either human beings or animals. As part of such studies, medicines or treatments are often compared to medicines, either new or existing, or treatments already on the market.

To gather a sufficient supply of those medicines or treatments already on the market for testing, the commercially available products are pooled together in a collection container and then re-packaged for use in new or ongoing studies.

Prior art systems and methods for pooling small volumes of liquid are essentially manual operations in which workers use their hands to first manually remove the tops from individual bottles of liquid medicines and then manually dump the contents out of the bottles, typically a small volume of a liquid medicine, into a collection container. This process of pooling together small volumes of liquid medicines is typically conducted in a controlled environment to assure that the medications are not contaminated.

Risks associated with the manual pooling of small volumes of liquid medicine include contamination and spillage. In addition, the simple act of manually removing tops from multiple individual bottles and then dumping the contents into a container can expose workers to repetitive-motion type injuries.

Accordingly, a need remains in the art for an automated system and method for pooling small volumes of liquids in a controlled environment to reduce the incidence of contamination and spillage as well as eliminating the exposure of workers to repetitive-motion type injuries.

SUMMARY

The disclosed invention is an automated system and method for pooling small volumes of liquid, typically in a controlled environment. The disclosed automated system and method reduces the incidence of contamination and spillage and eliminates the exposure of employees to repetitive-motion type injuries.

The automated system and method of the present invention includes three key components: a bottle collection and feed assembly, a bottle cutter and separator assembly, and a dumper assembly.

The bottle collection and feed assembly receives multiple individual sealed bottles, each individual bottle containing a small volume of a liquid medication. It is the purpose of the bottle collection and feed assembly to cause individual bottles to pass from the bottle collection portion of the bottle collection and feed assembly to the bottle cutter and separator assembly. This passage of the individual bottles to the bottle cutter and separator assembly is accomplished by the use of a powered conveyor.

Once an individual bottle has traveled on the powered conveyor to the bottle cutter and separator assembly, the individual bottle is engaged by a gripper. The gripper is part of the bottle cutter and separator assembly. Each individual sealed bottle is held in a predetermined position for separation of the top portion of the bottle from the bottom portion of the bottle by the bottle cutter and separator assembly. It is the bottom portion of the bottle which contains the small volume of liquid. The cutting portion of the bottle cutter and separator assembly, including an ultrasonic cutter, first cuts the bottle into a top portion and a bottom portion. Then the separator portion of the bottle cutter and separator assembly separates the top portion from the bottom portion. The top portion is then collected for recycling or disposal.

To pool the small volumes of liquid medicine together, the bottom portion of the bottle is automatically upended or dumped so that the small volume of liquid medicine flows out of the bottom portion of the bottle and into a collection container. The amount of liquid that has been dumped into the collection container may be determined by weighing the contents of the collection container. The remaining empty bottom is then collected for recycling or disposal. When the needed amount of liquid has been pooled in the collection container, the process is ended either manually or automatically using a signal from the scale used to weigh the contents of the collection container.

BRIEF DESCRIPTION OF THE DRAWING FIGURES

Figure 2:
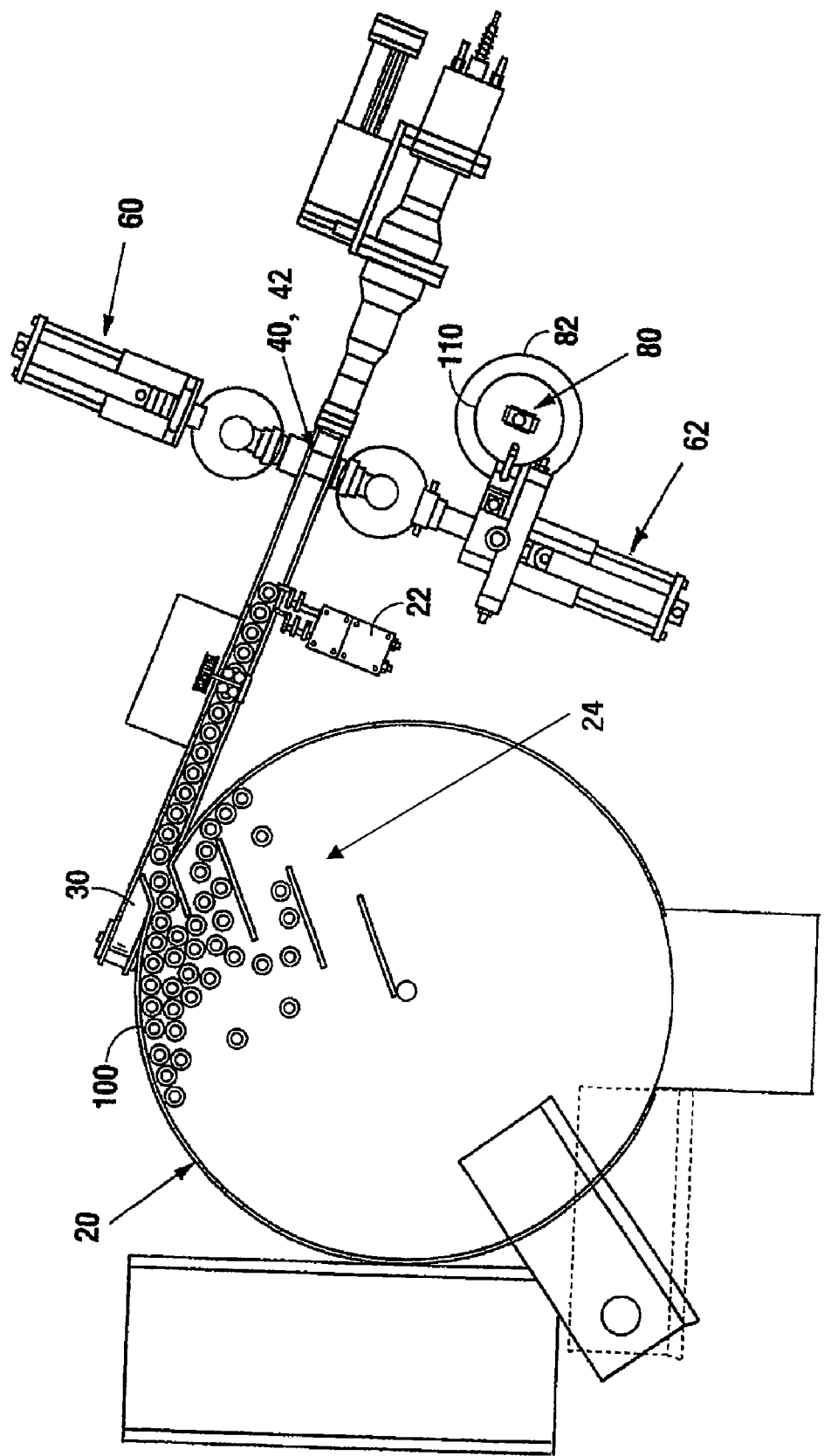

A better understanding of the system and method for pooling small volumes of liquid may be had from the drawing figures in which:

FIG. 1 is a schematic diagram illustrating the operation of the automated system and method of the present invention; and FIG. 2 is a plan view of a machine implementing the disclosed system and method.

DESCRIPTION OF THE EMBODIMENTS

As may be seen in FIG. 1, the system and method 10 of the present invention consists of mechanisms located at four key stations:

Station 1: a bottle feed assembly 20;
Station 2: an ultrasonic bottle cutter and separation assembly 40;
Station 3: a bottle pick-up/discard assembly 60; and
Station 4: a solution collection assembly 80.

As may be seen in FIG. 2 at the bottle feed assembly 20, multiple individual sealed bottles 100 containing small volumes of liquid are collected together in an upright position. Multiple sizes of bottles 100 may be added to the collection of individual bottles 100. Individual bottles 100 are separated from the collection of multiple bottles 100 by the feed mechanism 24, then individual bottles 100 are discharged from the collection of multiple bottles onto a powered conveyor 30. The feed mechanism 24 includes a plurality of separating elements angularly disposed on a top surface of the bottle feed assembly 20.

The powered conveyor 30 moves individual bottles 100 away from the bottle feed assembly 20 to a singulator 22 and then toward the ultrasonic bottle cutter and separator assembly 40. The powered conveyor 30 may be as long or as short as necessary and may be either a continuous feed conveyor system or a start/stop-type conveyor system.

Once each individual bottle 100 arrives at the ultrasonic bottle cutter and separator assembly 40 where the top portion of each individual bottle is to be separated from the bottom portion of each individual bottle, the individual bottle is engaged and positioned by a gripper 42. The gripper 42 positions the bottle with respect to the ultrasonic bottle cutter 40, to include compensating for the diameter and height of the bottle 100 where necessary.

Once the individual sealed bottle 100 has been positioned with respect to the bottle cutter and separator assembly 40, the top portion of the bottle 100 is separated from the bottom portion of the bottle 100. The top portion of the bottle 100 is then carried away by the bottle pick-up/discard assembly 60 and either recycled or disposed.

Preferably, the bottle cutter and separator assembly 40 uses an ultrasonic cutter to separate the top portion of the bottle from the bottom portion of the bottle. In an ultrasonic cutter, electrical energy is converted into high frequency mechanical motion creating sound vibrations. By focusing these sound vibrations on the bottle 100 itself, the molecules at the focus of the sound waves heat up so that they melt at a desired cutting plane. The effect is the same as mechanically cutting the individual bottle 100, except that little or no particulate matter is produced when the top portion of the bottle 100 is separated from the bottom portion of the bottle 100. The ultrasonic cutter mechanism preferably includes a generator or power supply, a transducer, a booster, and a horn or acoustic tool. Use of an ultrasonic cutter mechanism enables sterility of the liquid in the bottle to be maintained by the disclosed system 10 and the effective elimination of any surface matter which would contaminate the liquid in the bottle 100. While an ultrasonic cutter mechanism is used in the preferred embodiment, those of ordinary skill in the art will understand that other bottle cutting mechanisms may be used, as long as sterility is maintained and particulate matter is effectively eliminated.

With the small volume of liquid residing in the bottom portion of the individual bottle 100 now exposed, the bottom portion of the bottle 100 is now up-ended over the solution collection assembly 80 so that the small volume of liquid within the bottle 100 flows out. The small volume of liquid is conducted, preferably along a sterile pathway, to a collection container 110 where the small volume of liquid is pooled together with other small volumes of like liquid in the collection container 110, such as a glass carboy. Once the bottom portion of each individual bottle 100 has been emptied, the collected severed bottoms are picked up by the bottle pick-up/discard assembly 62 for disposal or recycling.

In a preferred embodiment, the collection container 110 rests upon a scale 82. The scale 82 determines the weight of the collection container 110 as it is being filled and thereby determines the total volume of the small volumes of liquid pooled together. The scale 82 may be programmed to provide a signal reflecting its measurement of the weight of the liquid contained therein to a control which shuts off the system 10 disclosed herein when the required amount of small volumes of liquid have been pooled together.

While the present invention has been disclosed according to its preferred embodiment, those of ordinary skill in the art will understand that other embodiments have been enabled by the foregoing disclosure. Such other embodiments shall be included within the scope and meaning of the appended claims.

What is claimed is:

1. A system for removing small volumes of liquid from individual bottles and then accumulating said small volumes of liquid in a collection container, said system comprising:

a bottle feed assembly on which a collection of individual bottles containing small volumes of liquid is gathered;

a feed mechanism for discharging a line of individual bottles from said bottle feed assembly onto a powered conveyor, said feed mechanism having a plurality of separating elements angularly disposed on a top surface of said bottle feed assembly;

said powered conveyor having a singulator and being constructed and arranged to move an individual bottle to a bottle cutter mechanism;

said bottle cutter mechanism being constructed and arranged to sever the top of each individual bottle from the bottom of each individual bottle;

a separation mechanism for moving the severed top of each individual bottle away from the bottom of each individual bottle;

a dumper for causing the liquid remaining in said severed bottom portion of each individual bottle to flow into said collection container; and a scale for weighing said collection container, said scale having a control that terminates operation of said system for removing small volumes of liquid when a required amount of said liquid is collected in said collection container.

2. The system as defined in claim 1 wherein said bottle cutter mechanism further includes a gripper to hold each individual bottle while the top portion is being severed from the bottom portion, said gripper being capable of compensating for different diameters and heights of said individual bottles.

3. The system as defined in claim 1 further including a system for collecting said severed top of each individual bottle.

4. The system as defined in claim 1 further including a system for collecting said severed and emptied bottoms of each individual bottle.

5. The system as defined in claim 1 wherein said cutter mechanism uses ultrasonic energy to sever the top of an individual bottle from the bottom of an individual bottle.

\* \* \* \* \*

UNITED STATES PATENT AND TRADEMARK OFFICE
CERTIFICATE OF CORRECTION

PATENT NO. : 7,594,790 B1  Page 1 of 1
APPLICATION NO. : 11/429341
DATED : September 29, 2009
INVENTOR(S) : David A. Edelen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 672 days.

Signed and Sealed this

Twenty-eighth Day of September, 2010

David J. Kappos
*Director of the United States Patent and Trademark Office*